(12) United States Patent
Jin et al.

(10) Patent No.: US 8,129,446 B2
(45) Date of Patent: Mar. 6, 2012

(54) RADICAL POLYMERIZABLE MACROCYCLIC RESIN COMPOSITIONS WITH LOW POLYMERIZATION STRESS

(75) Inventors: Xiaoming Jin, Middletown, DE (US); Paul D. Hammesfahr, Wyoming, DE (US)

(73) Assignee: DENTSPLY International Inc., York, PA (US)

( * ) Notice: Subject to any disclaimer, the term of this patent is extended or adjusted under 35 U.S.C. 154(b) by 0 days.

(21) Appl. No.: 12/912,951

(22) Filed: Oct. 27, 2010

(65) Prior Publication Data

US 2011/0152569 A1 Jun. 23, 2011

Related U.S. Application Data

(63) Continuation of application No. 12/655,028, filed on Dec. 22, 2009, now abandoned.

(51) Int. Cl.
*A61K 6/083* (2006.01)
*C07C 69/54* (2006.01)
*C07C 69/025* (2006.01)
*C07C 69/52* (2006.01)

(52) U.S. Cl. ....... 523/115; 433/228.1; 106/35; 560/129; 560/140; 560/205

(58) Field of Classification Search .................. 523/115; 433/228.1; 160/35; 560/129, 140, 205
See application file for complete search history.

(56) References Cited

U.S. PATENT DOCUMENTS

| | | | |
|---|---|---|---|
| 4,131,729 A | 12/1978 | Schmitt et al. | |
| 4,323,348 A * | 4/1982 | Schmitz-Josten et al. | 523/116 |
| 4,323,696 A | 4/1982 | Schmitz-Josten et al. | |
| 4,379,695 A | 4/1983 | Orlowski et al. | |
| 4,407,984 A | 10/1983 | Ratcliffe et al. | |
| 4,459,193 A | 7/1984 | Ratcliffe et al. | |
| 4,644,053 A | 2/1987 | Brunelle et al. | |
| 4,722,947 A | 2/1988 | Thanawalla et al. | |
| 4,744,827 A | 5/1988 | Winkel et al. | |
| 5,047,261 A | 9/1991 | Moussa et al. | |
| 5,110,893 A * | 5/1992 | Fukuyama | 528/125 |
| 5,321,117 A * | 6/1994 | Brunelle | 528/272 |
| 5,444,104 A | 8/1995 | Waknine | |
| 5,609,675 A | 3/1997 | Noritake et al. | |
| 5,621,119 A | 4/1997 | Podszun et al. | |
| 5,760,142 A | 6/1998 | Klee | |
| 5,792,821 A * | 8/1998 | Bowen | 506/19 |
| 5,846,075 A | 12/1998 | Shu et al. | |
| 5,856,374 A | 1/1999 | Ono et al. | |
| 5,886,064 A | 3/1999 | Rheinberger et al. | |
| 5,944,527 A | 8/1999 | Hasel | |
| 5,962,703 A | 10/1999 | Moszner et al. | |
| 5,998,499 A | 12/1999 | Klee et al. | |
| 6,022,940 A | 2/2000 | Byerley et al. | |
| 6,031,015 A | 2/2000 | Ritter et al. | |
| 6,037,444 A * | 3/2000 | Rannard et al. | 528/423 |
| 6,043,361 A | 3/2000 | Evans et al. | |
| 6,057,460 A | 5/2000 | Moszner et al. | |
| 6,096,903 A | 8/2000 | Moszner et al. | |
| 6,121,344 A | 9/2000 | Angeletakis et al. | |
| 6,127,450 A | 10/2000 | Angeletakis | |
| 6,147,136 A | 11/2000 | Bissinger | |
| 6,177,534 B1 | 1/2001 | Antonucci et al. | |
| 6,184,339 B1 | 2/2001 | Stansbury et al. | |
| 6,187,836 B1 | 2/2001 | Oxman et al. | |
| 6,204,302 B1 | 3/2001 | Rawls et al. | |
| 6,232,367 B1 | 5/2001 | Kobashigawa et al. | |
| 6,262,142 B1 * | 7/2001 | Wang et al. | 523/116 |
| 6,344,556 B1 * | 2/2002 | Evans et al. | 540/467 |
| 6,353,040 B1 | 3/2002 | Subelka et al. | |
| 6,353,061 B1 | 3/2002 | Klee et al. | |
| 6,376,026 B1 * | 4/2002 | Correll et al. | 427/512 |
| 6,380,347 B1 * | 4/2002 | Lau et al. | 528/219 |
| 6,384,106 B1 | 5/2002 | Angeletakis | |
| 6,391,940 B1 | 5/2002 | Blackwell et al. | |
| 6,395,803 B1 | 5/2002 | Angeletakis | |
| 6,399,037 B1 | 6/2002 | Pflug et al. | |
| 6,448,301 B1 | 9/2002 | Gaddam et al. | |
| 6,495,643 B1 | 12/2002 | Evans et al. | |
| 6,566,413 B1 | 5/2003 | Weinmann et al. | |
| 2002/0025993 A1 | 2/2002 | Klee et al. | |
| 2002/0068771 A1 | 6/2002 | Klee et al. | |
| 2002/0128347 A1 | 9/2002 | Blackwell et al. | |
| 2003/0060535 A1 | 3/2003 | Moszner et al. | |
| 2003/0125435 A1 | 7/2003 | Norling et al. | |
| 2004/0077882 A1 | 4/2004 | Moszner et al. | |
| 2004/0106741 A1 | 6/2004 | Kriessel et al. | |
| 2005/0154199 A1 | 7/2005 | Whiteford et al. | |
| 2006/0063854 A1 | 3/2006 | Jin et al. | |

FOREIGN PATENT DOCUMENTS

| | | |
|---|---|---|
| WO | 9702787 A1 | 1/1997 |
| WO | 9917677 A1 | 4/1999 |
| WO | 0003688 A1 | 1/2000 |
| WO | 0195862 A1 | 12/2001 |
| WO | 2005123008 A1 | 12/2005 |

OTHER PUBLICATIONS

Wang et al, Noval Aromatic Macrocyclic Oligomers: Intermediates for the preparation of high-performance polymers, Elsevier Reactive & Functional Polymers 30 (1996): p. 205-227.

Hall et al, Recent Research on the Synthesis and Applications of Cyclic Oligomers, Elsevier Reactive & Functional Polymers 41 (1999), p. 133-139.

Bogdal D., Pielichowski J., Boron A.: Application of Diol Dimethacrylates in Dental Composites & their influence on polymerization Shrinkage- Journal of Applied Polymer Science, vol. 66, 1997, pp. 2333-2337-XP002346645.

* cited by examiner

*Primary Examiner* — Michael Pepitone
(74) *Attorney, Agent, or Firm* — Douglas J. Hura; Leana Levin; David A. Zdurne

(57) ABSTRACT

A composition of macrocyclic oligomer with at least one (meth)acrylate polymerizable group. A method includes preparing an activated precursor of an oligomer at pseudo high-dilution conditions. A method also includes preparing an activated precursor of an oligomer by reacting the precursor with an activated coupling agent, wherein the precursor is condensable and polymerizable.

4 Claims, No Drawings

RADICAL POLYMERIZABLE MACROCYCLIC RESIN COMPOSITIONS WITH LOW POLYMERIZATION STRESS

RELATED APPLICATIONS

This is a Continuation Application which claims priority to U.S. Ser. No. 12/655,028 filed on Dec. 22, 2009, now abandoned, which claims priority to U.S. Ser. No. 12/381,781 filed on Mar. 16, 2009, now abandoned, which claims priority to U.S. Ser. No. 12/079,525 filed on Mar. 27, 2008, now abandoned, which in turn claims priority to U.S. Ser. No. 11/153,090 filed on Jun. 15, 2005, now abandoned, which in turn claims priority to provisional patent application Ser. No. 60/579,836 filed on Jun. 15, 2004, now abandoned.

FIELD OF THE INVENTION

This invention relates to free radical polymerizable macrocyclic compounds and composition, which feature by their low shrinkage and low contraction stress upon polymerization. Such low shrinkage and low stress resin could find their wide range of applications, especially in microelectronic, special coating and restorative dentistry where the dimensional stability and contraction stress within cured materials are critical to the total performance.

BACKGROUND OF THE INVENTION

The polymerization shrinkage of curable material is referred to the dimensional contraction during polymerization or curing, because the formation of covalent bonding during polymerization bring the molecules closer each other than that while they are free in van der Walls distance. The origin of polymerization stress, on the other hand, comes from a restrained polymerization or shrinking during curing. Therefore, it is not only related to polymerization shrinkage, but also is dependent on the polymerization kinetics.

It is well known that with increasing molecular weight, the mobility of polymeric chain would be limited, the diffusion is becoming the rate control factor. In addition, such a limited mobility in a cross-linking system appear to come earlier in comparison with linear system, which means extra reaction would lead to an increasing polymerization stress. There are different ways to control the stress generation and development:

1. Slow down the polymerization rate;
   Introducing a special rate controller like stable radicals;
   Creating different polymerization zones from which the stress developed in a polymerized zone could be transferred to its adjacent unpolymerized zone and got relief like segmental polymerization technique;
   Employing different polymerization groups;
   Using large-size macromonomer to limited its reactivity at the early stage;
2. Reduce the conversion;
   Pre-building a 2D or 3D structure like macrocyclics, dendrimers or hyperbranches;
3. Limiting the cross-link density to offer acceptable mechanical property.

To reduce polymerization shrinkage and stress in the specific dental restorative composite, all of above approaches are taking into account. In this invention, however, the objective is to present a general method to produce a macrocyclic oligomer which would be converted into 3D network via free radical polymerization.

U.S. Pat. No. 4,644,053, disclosed a method to synthesize single macrocyclic compounds. Then various macrocyclics oligomers, including carbonates, esters, amides, ethers, imides, sulfides, et al, have been prepared. However, high temperature ring-opening reaction has to be involved to convert these macrocyclics into high molecular weight polymers.

U.S. Pat. No. 5,047,261, disclosed a composition containing a five-member carbonate cyclic group for fast copolymerization with methacrylate.

U.S. Pat. No. 5,792,821, disclosed polymerizable cyclidextrin (CD) derivatives, in which methacrylate was attached on CD.

U.S. Pat. No. 5,962,703, disclosed functionalized bicyclic methacrylate with norboneyl or norbonadienl group.

U.S. Pat. No. 6,043,361, disclosed polymerizable cyclic allylic sulfides is used for low shrinkage materials.

APPROACH

The macrocyclic oligomers are prepared under pseudo-high-dilution condition via a condensation between a reactive and free radical polymerizable precursor and various coupling agents to afford carbonate, ester, siloxane, phosphonate, et al linkages to result in macrocyclic oligomers. To avoid the premature polymerization of methacrylate groups, the condensation groups usually have to be activated to assure a mild reaction for cyclization with the coupling monomers.

BisGMA is one of widely used dental resin and it contains two free radical polymerizable group, methacrylate and two hydroxyl groups. This turns BisGMA an ideal candidate for polymerizable macrocyclic oligomer, although the presence of BisGMA isomer would make more complicated to this approach. As shown in Scheme I, carbonyldiimidazol (CDI, 1), was used to selectively reacted with the secondary alcohol in BisGMA (2) to give an activated BisGMA, DIZ-BisGMA (3). It was isolated and the chemical structure of DIZ-BisGMA was fully characterized with FITR and NMR. Actually, according to the recent report by Davis et al of Courtlaulds, England, CDI and its intermediates could exhibit surprisingly specificity towards primary, secondary, tertiary functional groups, of the same type, during the controlled formation of various well-defined molecular sequence. Our idea is to adopt same chemistry of CDI and to activate the two secondary hydroxyl group. Furthermore, an activated precursor, DIZ-BisGMA, was made to react with various primary diols 1,10-decanediol, under a pseudo high-dilution condition, as shown in Scheme II. Both reactants were simultaneously charged into the system in a high-dilution condition via slowly, precisely controlled addition to ensure a favorable formation of cyclic product. Since the product, C10-CYCBGM (5), is accumulated with a final concentration of 0.02M, which is much higher than the classical high dilution condition (0.001M), this procedure is, therefore, referred as pseudo-high-dilution approach. Since imidazol is produced from both precursor and cyclization steps, a continuous process was successfully developed without direct separation of DIZ-BisGMA.

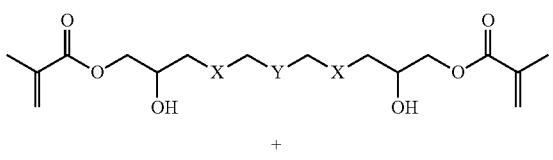

+

3
-continued
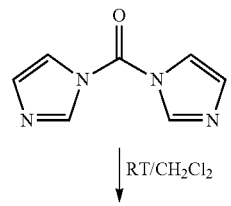
RT/CH₂Cl₂ ↓
4
-continued
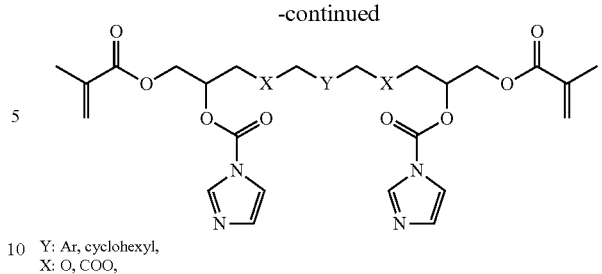
Y: Ar, cyclohexyl,
X: O, COO,
Sheme I: Preparation of Activated BisGMA(DIZ-BisGMA)
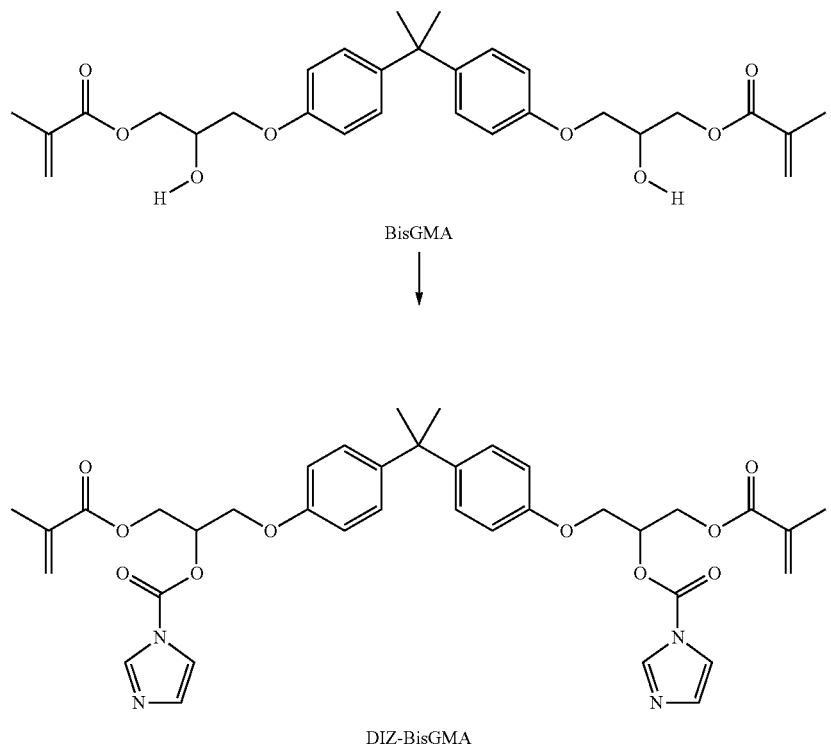
Scheme III: C10-CYCBGM Preparation
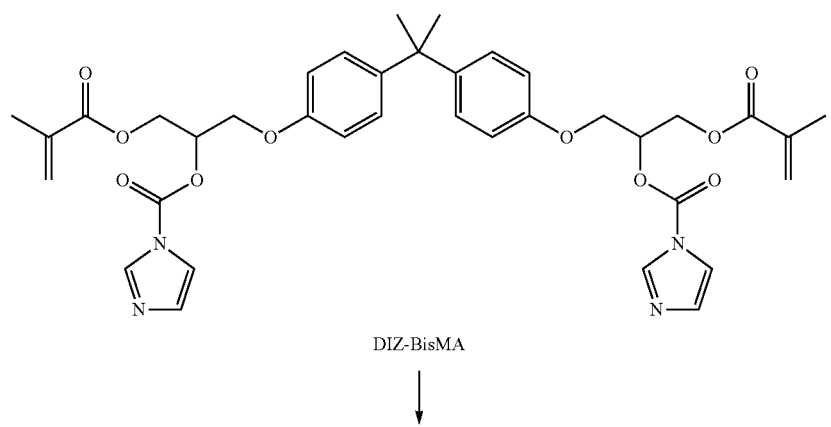

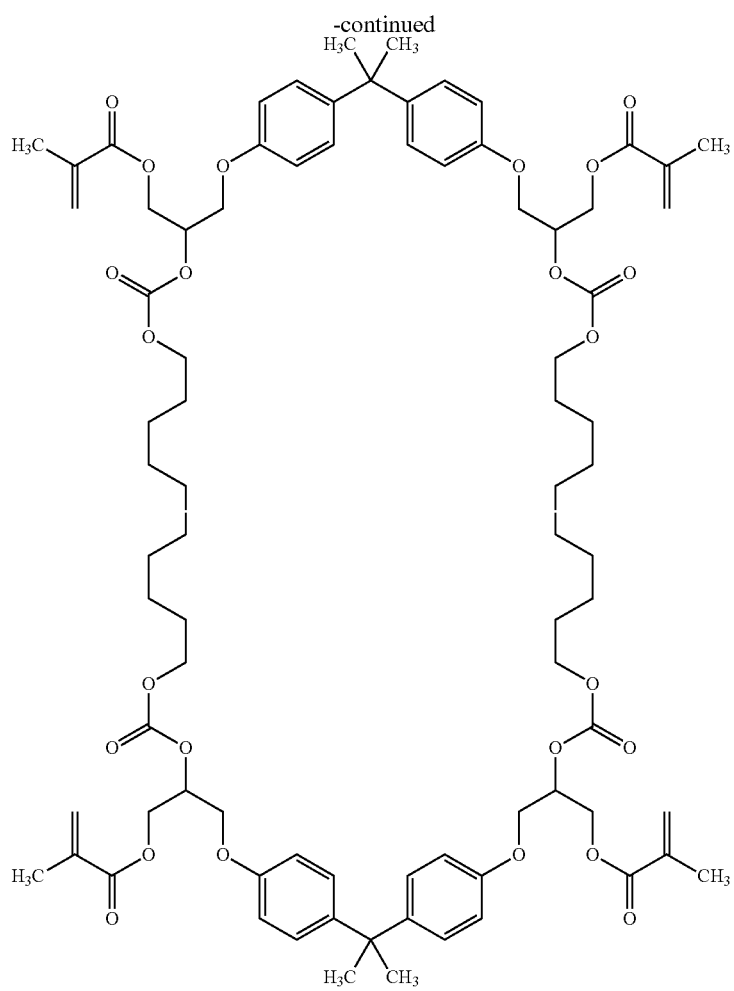

C10-CYCBGM

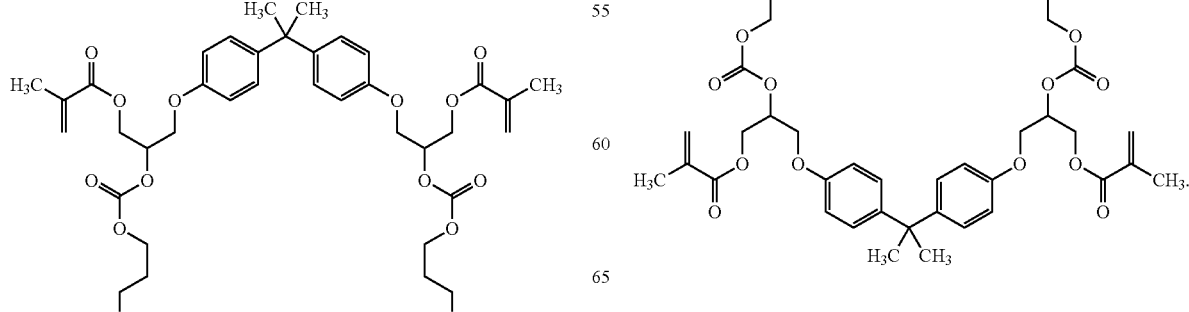

4. A macrocyclic oligomer having the structure of
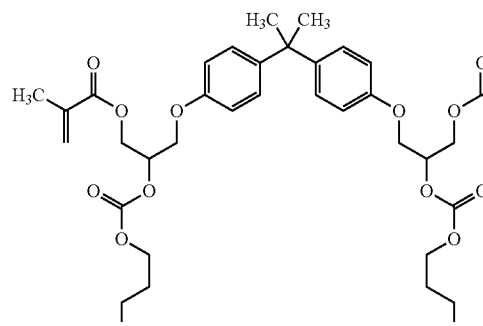
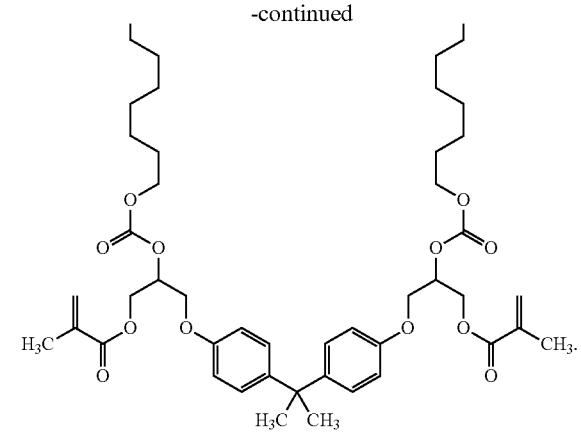

What is claimed is:

1. A method of forming a macrocyclic oligomer, comprising:
    condensing a reactive and free radical polymerizable precursor and a coupling agent resulting in formation of the macrocyclic oligomer,
    wherein the macrocyclic oligomer is present in solution with a final concentration of 0.02M, and
    wherein the polymerizable precursor is DIZ-BisGMA and the coupling agent is a primary diol.

2. The method of claim 1, wherein the primary diol is 1,10-decanediol.

3. The method of claim 1, wherein the macrocyclic oligomer is